US010351196B2

(12) United States Patent
Bain

(10) Patent No.: US 10,351,196 B2
(45) Date of Patent: Jul. 16, 2019

(54) BICYCLE ATTACHMENT FOR CARRYING A FOLDING CHAIR

(71) Applicant: Lawrence R. Bain, Dennis, MA (US)

(72) Inventor: Lawrence R. Bain, Dennis, MA (US)

( * ) Notice: Subject to any disclaimer, the term of this patent is extended or adjusted under 35 U.S.C. 154(b) by 0 days.

(21) Appl. No.: 15/417,562

(22) Filed: Jan. 27, 2017

(65) Prior Publication Data
US 2018/0215430 A1 Aug. 2, 2018

(51) Int. Cl.
*B62J 11/00* (2006.01)
*B62J 7/04* (2006.01)

(52) U.S. Cl.
CPC .......... *B62J 11/00* (2013.01); *B62J 7/04* (2013.01)

(58) Field of Classification Search
CPC ... B62J 11/00; B62J 11/005; B62J 7/04; B62J 7/08
USPC .................................................. 224/412–463
See application file for complete search history.

(56) References Cited

U.S. PATENT DOCUMENTS

| 3,827,613 | A | * | 8/1974 | Meyer | B62J 9/00 224/424 |
| 4,296,878 | A | | 10/1981 | Ward | |
| 4,387,836 | A | * | 6/1983 | Laesch | B62J 7/02 224/412 |
| 4,792,072 | A | * | 12/1988 | Gibson | B62J 11/00 224/425 |
| 5,322,311 | A | * | 6/1994 | Dunn | B62J 15/00 224/427 |
| 5,340,003 | A | | 8/1994 | Wilson | |
| 5,687,894 | A | * | 11/1997 | Cavallaro | B62J 11/00 224/448 |
| 6,527,153 | B1 | * | 3/2003 | Manos | B62J 7/00 224/427 |
| 6,749,096 | B1 | * | 6/2004 | Manos | B62J 11/00 224/412 |
| 2005/0224546 | A1 | | 10/2005 | Rak | |
| 2006/0065792 | A1 | * | 3/2006 | Valin | A63B 55/61 248/96 |

FOREIGN PATENT DOCUMENTS

WO PCT/ES2016/070891 12/2016
WO WO 2017103311 A1 * 6/2017 .......... B62K 27/006

* cited by examiner

*Primary Examiner* — Scott T McNurlen
(74) *Attorney, Agent, or Firm* — Bookstein IP Law

(57) ABSTRACT

A foldable-chair carrier for a bicycle includes a frame that defines a plurality of generally planar, inclined chair-supporting surfaces over the rear wheel of the bicycle. The frame includes a pair of enlarged hooks at the forward, upper portion of the frame, with the hooks being arranged to receive opposite ends of one of the structural tubes of the chair in its folded configuration. The hooks may be sufficiently large to receive two or more of the folded chairs, in a stacked array. The hooks are configured so that even if the bicycle is running on uneven ground, the chairs will be unlikely to be thrown from the frame even in the absence of supplementary tie-downs.

9 Claims, 5 Drawing Sheets

BICYCLE ATTACHMENT FOR CARRYING A FOLDING CHAIR

FIELD

Figure 1:
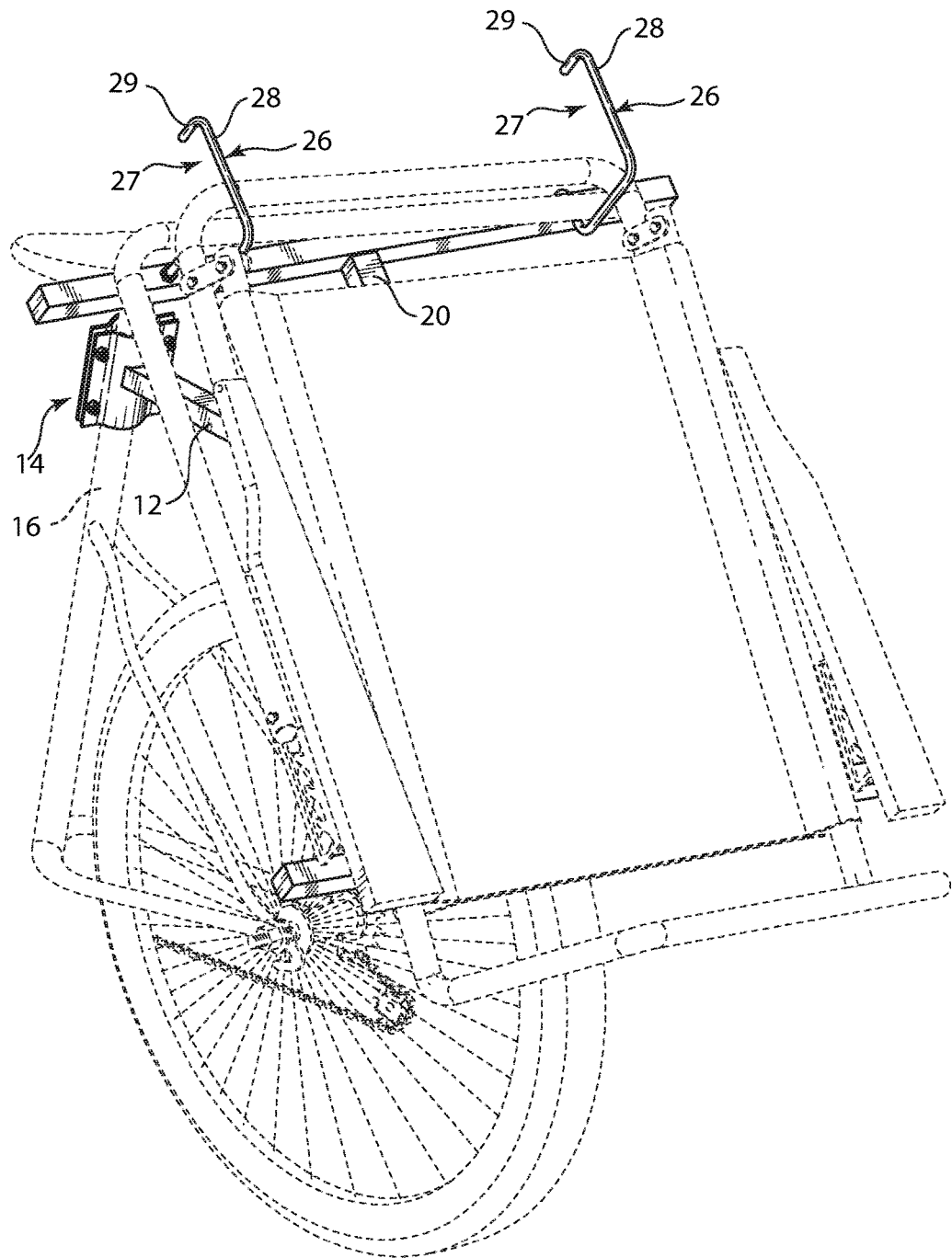

The invention relates to an attachment for a bicycle to carry a folding chair, such as a beach chair or the like.

BACKGROUND

Residents of communities that have recreation facilities, such as beaches or sports fields, where it would be desirable to bring folding chairs to the facility may wish to travel to the facility by bicycle. Typically, such foldable chairs are lightweight and may have a frame made from aluminum tubing and/or wood with a seat and back formed from fabric or polymer webbing or the like attached to the frame. When folded such chairs typically assume a generally flat configuration. Although light weight, such chairs typically are awkward to carry, particularly for a person traveling by bicycle. A chair that is simply hung from the bicycle handlebar without a supplemental tie-down to the bicycle will tend to swing or be jostled about as the rider rides to his destination. The chair may move about such that parts can interfere with operation of the bicycle and may present a risk of injury to the rider. It would be desirable, therefore to provide a bicycle attachment by which one or more lightweight, folding chairs may be easily and safely mounted and removed from a bicycle without requiring supplemental tie-downs or other fastening devices to prevent the chair from interfering with operation of the bicycle.

SUMMARY

The chair carrier includes a frame that defines a plurality of chair-supporting surfaces over the rear wheel of the bicycle. The chair-supporting surfaces are arranged to lie, generally, in a plane that is inclined forwardly and upwardly of the bicycle. The frame includes a pair of enlarged hooks at the forward, upper portion of the frame, with the hooks being arranged to receive opposite ends of one of the structural tubes of the chair in its folded configuration. The trailing portions of the chair simply rest on the inclined supporting surfaced of the carrier frame. The hooks may be sufficiently large to receive two or more of the folded chairs, in a stacked array. The hooks are configured so that even if the bicycle is running on uneven ground, the chairs will be unlikely to be thrown from the frame even in the absence of supplementary tie-downs. The lower, rearward portions of the inclined frame provide a surface to support the lower portions of the folded chair. The chair-supporting frame is positioned over the rear wheel of the bicycle by a cantilevered support bar that is secured at its forward end to the adjustable seat post of the bicycle and extends rearwardly over the rear wheel of the bicycle. The inclined frame is secured to the rearward end of the support bar. The folded chairs can be stacked easily by placing a portion of the chair frame over the hooks with the opposite portion of the folded chair simply resting on lower portion of the inclined frame. The chairs can be removed simply by taking them off the hooks.

DRAWINGS

Figure 2:
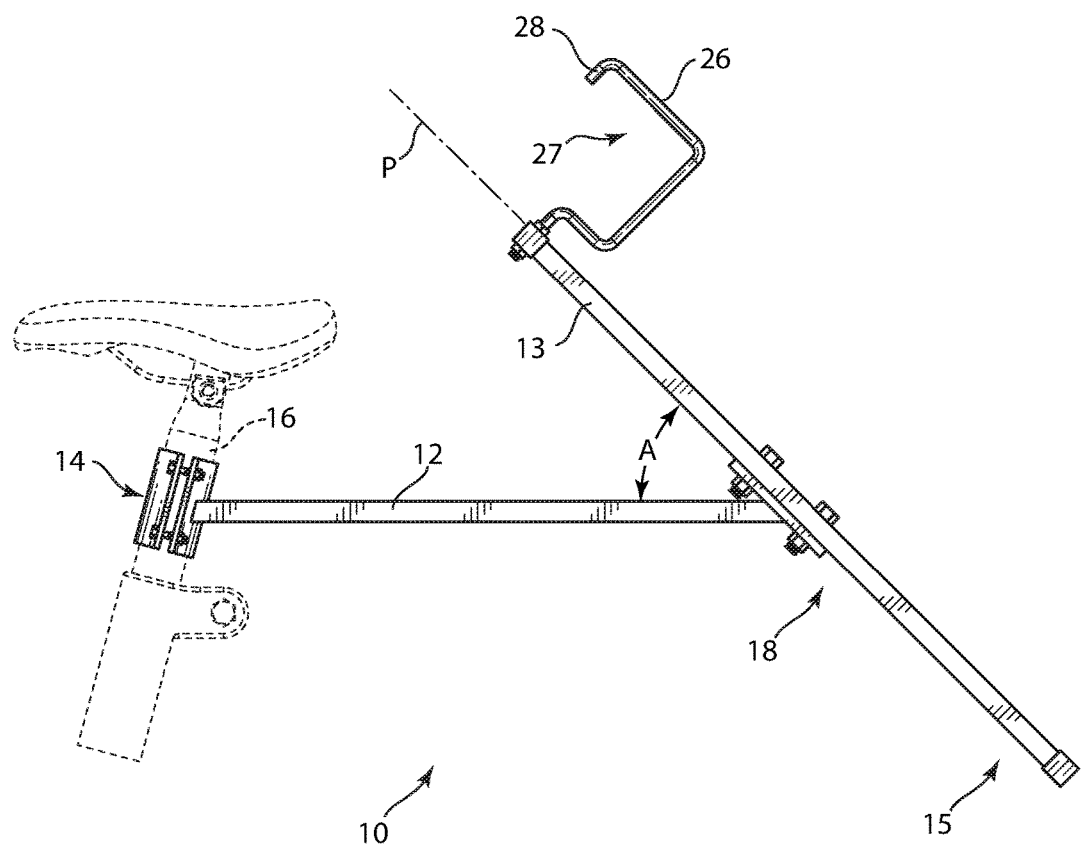
Figure 3:
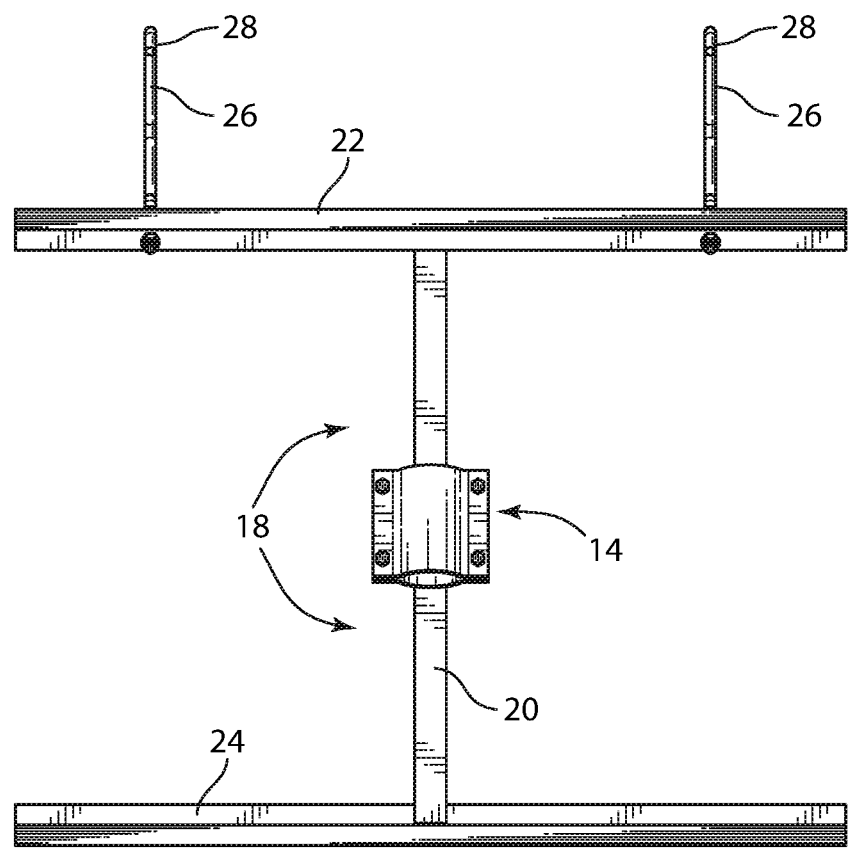
Figure 4:
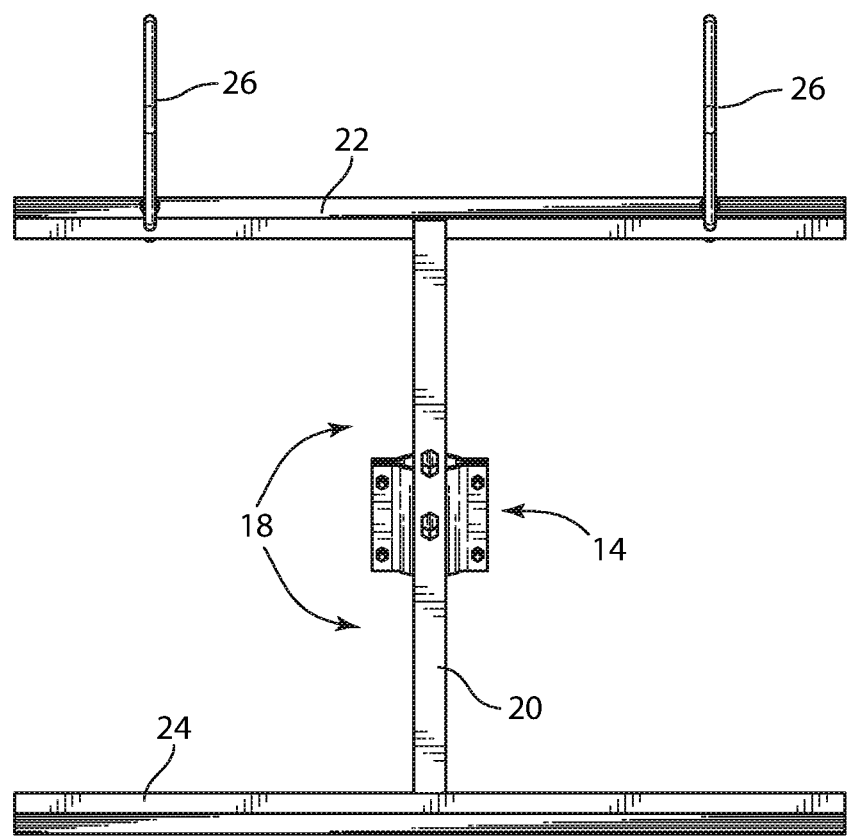
Figure 5:
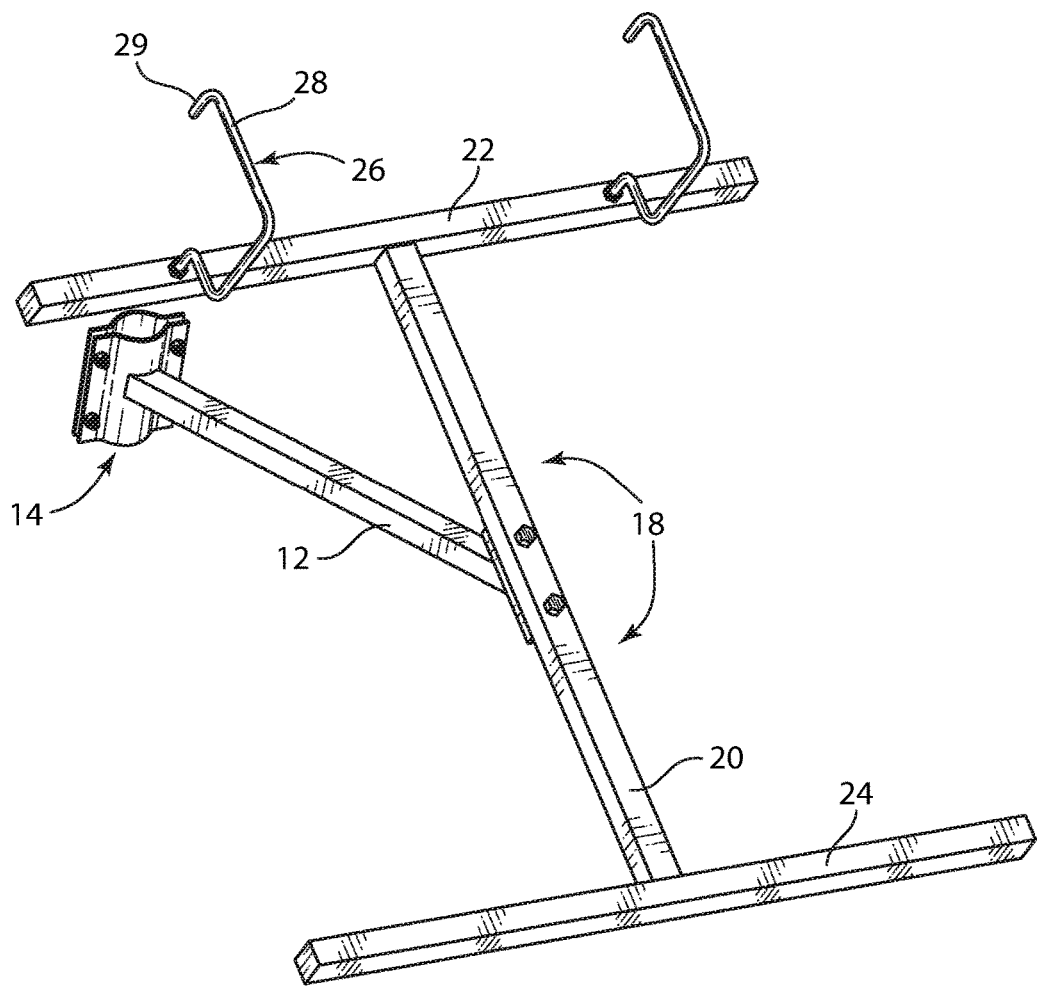

The various objects and advantages of the invention will be appreciated more fully from the following description with reference to the accompanying drawings in which:

FIG. 1 is an illustration of the carrier mounted on a bicycle with a folded beach chair shown in phantom;
FIG. 2 is a side view of the device;
FIG. 3 is a front plan view of the device;
FIG. 4 is a rear plan view of the device; and
FIG. 5 is an oblique rear view of the device.

DETAILED DESCRIPTION

FIG. 1 shows the rear portion of a bicycle to which a chair carrier 10 of the invention has been mounted. The carrier 10 may include a horizontal support bar 12 that may have a clamp 14 at its forward end by which the carrier 10 is attached in a cantilevered manner to the adjustable seat post 16 of the bicycle. The clamp 14 may be secured by an arrangement of nuts and bolts or, alternatively, the clamp may be a quick release clamp. The support bar 12 is the only portion of the carrier that is attached directly to the bicycle. The support bar 12 extends rearwardly from its connection point to the seat post over the rear wheel of the bicycle.

A chair-supporting frame 18 is attached to the rearward end of the support bar 12. In the preferred embodiment shown, the chair-supporting frame 18 includes a center bar 20 that is secured between its ends to the rear end of the support bar 12 at an angle A, preferably of the order of about 45 degrees, such that the center bar 20 is inclined with its upper end 13 well forward of its lower end 15. An upper cross bar 22 is secured to the forward upper end of the center bar 20, as by welding or other conventional means, and a lower cross bar 24 is similarly secured to the lower, rearward end of the center bar 20 to define an H-shaped arrangement. The upper and lower cross bars 22, 24 and the center bar 20 generally define a plane P having a plurality of generally planar chair-supporting surfaces on which the portions of the folded chairs can rest.

At least one, and preferably a pair of large hooks 26 is secured to opposed lateral portions of the upper cross bar 22. The hooks 26 are adapted and configured to receive opposed ends of a section of the frame of the chair. The hooks have openings 27 that face forwardly and preferably should have a height sufficient to enable at least two or more flat-folded chairs to be stacked on the inclined frame and in engagement with the hooks 26. The hooks 26 should have forwardly extending portions 28 that extend forwardly sufficiently to assure that none of the folded chairs will be thrown off during use. The hooks also may have a terminal portion 29 that extends downwardly to further prevent the chair from becoming dislodged. Chairs may be loaded onto the carrier simply by engaging a section of the chair frame with the hooks and allowing the trailing portion of the chair to rest against the surfaces that define the inclined plane P.

From the foregoing it will be appreciated that the invention provides a simple and easily used arrangement by which a bicycle rider can carry foldable chairs in a relatively safe manner and without requiring supplemental tie-downs or the like. The inclined arrangement of the chair support frame and cooperating hooks enable the chairs to be easily loaded onto and unloaded from the bicycle. Although the chair or chairs are mounted loosely on the device, that is, without tie-downs, and are free to shift about, they are maintained on the carrier even over rough terrain.

The components of the device may be made from various materials, with aluminum tubing being preferred. Various tubing cross sections may be employed with a square or rectangular shape being preferred. The components of the device may be connected in a permanent connection, as by welding or may be connected with threaded fasteners that enable disassembly as may be desired, for example, for compact packaging.

It should be understood that the foregoing description of the invention is intended merely to be illustrative thereof and that other embodiments, modifications and equivalents may be apparent to those skilled in the art without departing from the principles of the invention.

Having thus described the invention, I claim:

1. A bicycle attachment for carrying a folding chair comprising:
   a chair support having upper and lower portions;
   a support structure connectable to the bicycle and connected to the chair support so that when connected to the bicycle the chair support is inclined in a forward and upward orientation in which the upper portion is forward of and above the lower portion;
   at least one hook attached to the forward, upper portion of the chair support, each hook having a forwardly facing opening receptive to a portion of a chair, and being configured to enable the chair to hang from each hook with portions of the chair resting on portions of the chair support below the hook
   wherein the at least one hook comprises a pair of laterally spaced hooks attached to the upper region of the chair support.

2. A bicycle attachment for carrying a folding chair as defined in claim 1 wherein the chair support is located above the rear wheel of the bicycle when the attachment is connected to the bicycle.

3. A bicycle attachment for carrying a folding chair as defined in claim 1 further comprising:
   the support structure comprising a cantilevered support bar having forward and rearward ends, a connector at the forward end of the support bar for securing the support bar to the seat post of the bicycle, the support bar extending rearwardly over the rear wheel of the bicycle and being attached at its rearward end to the chair support.

4. A bicycle attachment for carrying a folding chair as defined in claim 3 wherein the connector comprises a clamp.

5. A bicycle attachment for carrying a folding chair as defined in claim 4 wherein the clamp is a quick-release clamp.

6. A bicycle attachment for carrying a folding chair as defined in claim 1 wherein the chair support includes a center bar oriented in a forward and upward incline and having an upper, forward end and a lower, rearward end;
   an upper cross bar secured to and extending transversely of the upper, forward end of the center bar;
   wherein the pair of hooks are attached to opposite ends of the upper cross bar.

7. A bicycle attachment for carrying a folding chair as defined in claim 6 further comprising:
   a transversely extending lower cross bar attached to the rearward, lower end of the center bar, and being disposed in a common plane with the upper cross bar and center bar.

8. A bicycle attachment for carrying a folding chair as defined in claim 1 further comprising each hook having a downwardly extending terminal portion.

9. A bicycle attachment for carrying a folding chair as defined in claim 8 wherein each hook is fixedly secured to the upper cross bar.

* * * * *